United States Patent
Godler et al.

(10) Patent No.: US 6,542,842 B2
(45) Date of Patent: Apr. 1, 2003

(54) METHOD OF COMPENSATING PERIODIC SIGNALS IN SENSOR OUTPUT

(75) Inventors: Ivan Godler, Fukuoka-ken (JP); Masashi Horiuchi, Nagano-ken (JP)

(73) Assignee: Harmonic Drive Systems, Tokyo (JP)

(*) Notice: Subject to any disclaimer, the term of this patent is extended or adjusted under 35 U.S.C. 154(b) by 0 days.

(21) Appl. No.: 09/809,164

(22) Filed: Mar. 16, 2001

(65) Prior Publication Data

US 2001/0045824 A1 Nov. 29, 2001

(30) Foreign Application Priority Data

Mar. 17, 2000 (JP) ........................................ 2000-075007

(51) Int. Cl.[7] .............................. G01D 3/04; G01B 7/30
(52) U.S. Cl. ...................... 702/104; 73/504.03; 73/708; 702/75
(58) Field of Search ................ 702/104, 75; 73/504.03, 73/504.11, 510, 708

(56) References Cited

U.S. PATENT DOCUMENTS 4,566,327 A * 1/1986 Rider ...................... 73/504.03
5,629,481 A * 5/1997 Michel ...................... 73/204.18

FOREIGN PATENT DOCUMENTS

| JP | 57151153 | * | 8/1982 |
| WO | WO 9641120 | * | 12/1996 |

* cited by examiner

Primary Examiner—Kamini Shah
(74) Attorney, Agent, or Firm—Burns, Doane, Swecker & Mathis, L.L.P.

(57) ABSTRACT

A method of compensating periodic error signals in sensor output is provided. The method comprises obtaining a sum signal from sensing outputs of M sensor elements (where M is a positive integer), obtaining the amplitude and phase of N frequency components included in the sum signal, and calculating a sensing output gain adjustment coefficient for each sensor output. To ensure that a sum signal level obtained by summing a pre-adjustment output of each sensor element multiplied by the gain adjustment coefficient equals a sum signal level obtained by summing the unmodified outputs of the sensors, a gain adjustment coefficient is obtained for each sensor output by using a calculated scaling coefficient to perform pre-adjustment scaling of each gain adjustment coefficient. The adjustment gains thus obtained are used to adjust the gain of each sensor output.

4 Claims, 12 Drawing Sheets

(Method of maximizing amplitude of specific frequency components)

(Model of rotary type sensor)

FIG. 1

(Ripple signals from three pickups and their sum signals)

FIG. 2

(Frequency spectrum of sum signal of three pickups)

FIG. 4B (Waveforms before and after gain adjustment and frequency spectrum)

FIG. 5

(Signals from five pickups)

FIG. 6A

FIG. 6B (Waveforms of a sum signal and frequency spectrum)

FIG. 7A

FIG. 7B (Waveforms of a sum signal after gain adjustment and frequency spectrum)

FIG. 12A (Method of minimizing peak-to-peak amplitude of sum signals without specifying frequency components)

FIG. 12B

METHOD OF COMPENSATING PERIODIC SIGNALS IN SENSOR OUTPUT

This application claims priority under 35 U.S.C. §§ 119 and/or 365 to P-2000-75007 filed in Japan on Mar. 17. 2001; the entire content of which is hereby incorporated by reference.

BACKGROUND OF THE INVENTION

1. Field of the Invention

The present invention relates to a method for adjusting sensor output gain for removing a suppressing periodic error signal components in the output of sensors provided with multiple pickup sensors used for sensing rotational position of a rotating shaft, the position of a member moving linearly, velocity, acceleration, and so forth.

2. Prior Art Description

Accurate sensing of physical quantities associated with rotational or linear motion (such as position, velocity, acceleration, torque, etc.) plays an important role in the practical application of measurement and control technology. Particularly in the case of rotary motion, while it depends on the sensor principle involved, periodic error signals are a frequent occurrence. For example, when a pickup sensor is placed at one point for sensing the angle of a rotating shaft, or velocity or transmission torque, if there is shaft eccentricity and the sensitivity of the sensor depends on the distance from the shaft, rotation of the shaft is accompanied by the generation of periodic error signals in the output of the sensor.

The usual method of compensating for such error signals is to position a pair of identical pickups symmetrically with respect to the shaft and utilize the phase opposition of the two error signals to cancel out the error signals. However, the fact that the characteristics of the pickups do not always perfectly coincide, and that there is positional error and shaft roundness error, results in a situation that is not ideal. As such, it becomes impossible to perfectly cancel out error signals.

The present inventors encountered this type of problem when conducting research into the sensing of torque from a wave gear type reduction gear system. When using magnetostriction type torque sensors, we found that the problem of how to remove error signals in optical type rotary angular acceleration sensors, for example, had not been resolved. The application of Karman filters has been proposed as a periodic error signal compensation method, but from a practical standpoint the lengthy computation time involved makes the method problematical.

In view of the above, an object of the present invention is to provide a method of compensating periodic signals in sensor output that is able to readily remove periodic error signals in rotary and linear type sensors.

SUMMARY OF THE INVENTION

To attain the above object, the present invention provides a method of compensating periodic error signals in sensor output, said method comprising obtaining a sum signal from sensing outputs of M sensor elements (where M is a positive integer); obtaining amplitude and phase of N (N is a positive integer) frequency components included in the sum signal; taking $a_{ij}$ as sensing output amplitude of the jth (j=1 to N) sensor element at the ith (i=1 to N) frequency component, $\phi_{ij}$ as phase angle and $k_j$ as sensing output gain adjustment coefficient, obtaining adjustment coefficient $k_j$ for each sensor output by the simultaneous equation $$\begin{bmatrix} a_{ij}\cos\phi_{ij} \\ a_{ij}\sin\phi_{ij} \end{bmatrix}_{(2N \times M)} \{k_j\}_{(M)} = 0 \qquad (7)$$

ensuring that a sum signal level obtained by summing a pre-adjustment output of each sensor element multiplied by the gain adjustment coefficient $k_j$ equals a sum signal level obtained by summing unmodified outputs of said sensors, by obtaining a gain adjustment coefficient $k_j$ for each sensor output by using a scaling coefficient C obtained by $$C = \frac{M}{\sum_{j=1}^{M} k_j} \qquad (12)$$

to perform pre-adjustment scaling of each gain adjustment coefficient $k_j$, and using each adjustment gain $k_j$ thus obtained to adjust a gain of each sensor output.

Instead of the simultaneous equation, N frequency components can be removed or minimized by using a gain adjustment coefficient obtained for each sensor output by repeating for each sensor output a process comprising changing an output gain of one sensor in small increments while maintaining output gains of other sensors at a constant level.

Next, the present invention provides a gain adjustment method for maximizing a specific frequency component in sensor output, said method comprising obtaining a sum signal from sensing outputs of M sensor elements; calculating amplitude of specific frequency components from the sum signal; obtaining the sensor output gains at which the specific frequency components are maximized by repeating for each sensor output a process comprising changing the output gain of one sensor in small increments while maintaining output gains of other sensors at a constant level; ensuring that a sum signal level obtained by summing the outputs of the sensor elements each multiplied by the calculated gain equals a sum signal level obtained by summing unmodified outputs of said sensors, by obtaining an adjustment gain for each sensor output by using scaling to adjust each calculated gain; and using each adjustment gain thus obtained to adjust the gain of each sensor output signal to generate a sum signal in which said frequency components are maximized.

The present invention also provides a gain adjustment method for minimizing a specific frequency component in sensor output, said method comprising: obtaining a sum signal from sensing output of M sensor elements; obtaining a peak-to-peak amplitude of the sum signal; obtaining the sensor output gains that give the minimum peak-to-peak amplitude of the sum signal by repeating for each sensor output a process comprising changing the output gain of one sensor in small increments while maintaining the output gains of the other sensors at a constant level; ensuring that a sum signal level obtained by summing the outputs of the sensor elements each multiplied by the calculated gain equals a sum signal level obtained by summing unmodified outputs of said sensors, by obtaining an adjustment gain for each sensor output by using scaling to adjust each calculated gain; and using each adjustment gain thus obtained to adjust the gain of each sensor output signal to generate a sensing signal in which there is minimum peak-to-peak amplitude of the sum signal of the sensor outputs.

Further features of the invention, its nature and various advantages will be more apparent from the accompanying drawings and following detailed description of the invention.

DESCRIPTION OF THE PREFERRED EMBODIMENTS

Embodiments of the method of the present invention will be explained below with reference to the drawings, after an explanation of the basic principles of the method for compensating periodic error signals in sensor output, and the gain adjustment method, of the present invention.

Mathematical Model of Error Signals

Figure 1:
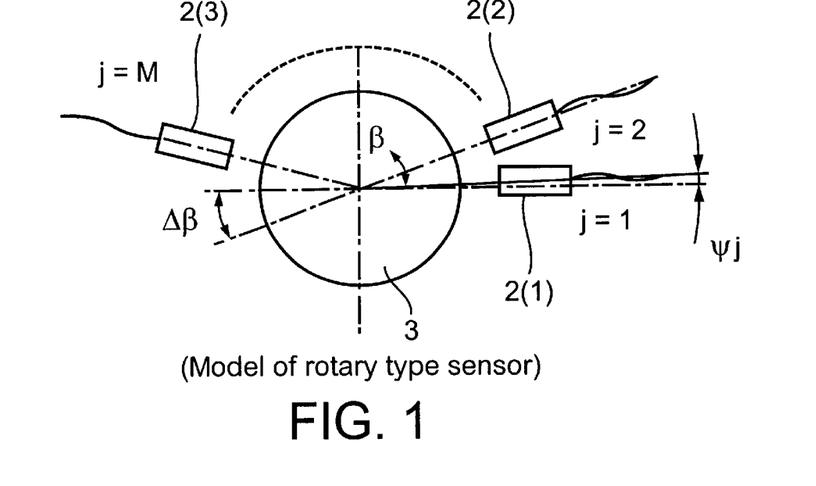
FIG. 1 is a schematic diagram of a rotary type sensor to which the present invention can be applied.

When thinking about periodic error signals, in the case of a rotary type sensor there is a tendency to imagine that the shaft is off-center. Let us consider the case of non-contact sensing of the transmission torque of a rotating shaft, as depicted in FIG. 1. Generally, in order to compensate for eccentricity, identical pickup sensors are placed symmetrically with respect to the shaft center. To generalize the model, let us assume that M sensor pickups (where M is a positive integer) 2(l) to 2(M) are positioned at fixed angular intervals $\Delta\beta$, and that at each pickup position there exists a different angular error $\psi j$. With such a model, taking rotation angle $\beta$ of the rotating shaft 3 as a variable, the jth error signal $e_j$ from a pickup can be modelled as follows.

$$e_j = \sum_{i=1}^{N} a_{ij}\cos[f_i(\beta - ((j-1)\Delta\beta + \psi_{ij}))] \tag{1}$$

With the model, taking into account not only eccentricity of the shaft 3 but also roundness error of the shaft 3 and the effect of the bearings, a plurality (N) of error signal frequency components (subscript i) are assumed to exist. $f_1$ is the frequency coefficient of each frequency component, and $a_{ij}$ and $\psi_{ij}$ are the i frequency component amplitude and phase error, respectively, of the jth pickup 2 (j). Since the amplitude $a_{ij}$ and phase error $\psi_{ij}$ normally will differ for each pickup and frequency component, a general model was constructed, as shown by equation (1). This model is used for the following analysis, so for the sake of simplicity, phase angle $\phi_{ij}$ is the only phase-related parameter used.

$$\Phi_{ij} = f_i((j-1)\Delta\beta + \psi_{ij}) \tag{2}$$

That is, at each sensor pickup j, $\phi_{ij}$ is the phase angle at each frequency component i.

In the case of a rotary type sensor frequency coefficient $f_i$ is dimensionless (periods/revolution), but since in the case of a linear type sensor $\beta$, $\Delta\beta$ and $\psi_{ij}$ are thought of as distances, in order to convert distances to angles, it is convenient to use rad/m as the $f_i$ unit.

When a sensor is comprised of a plurality of pickups 2(l) to 2(M), the final sensor output is considered to be the sum of the signals from all of the pickups. This also applies to error signals h, so that taking equations (1) and (2) into account, the sum h of error signals from all pickups can be modeled as follows.

$$h = \sum_{j=1}^{M} e_j = \sum_{i=1}^{N}\sum_{j=1}^{M} a_{ij}\cos(f_i\beta - \phi_{ij}) \tag{3}$$

This is a mathematical model of the error signals that are compensated.

Method of Compensating Error Signals

The above error signal mathematical model was used to consider a method for compensating error signals. That is, an investigation was made to find the conditions under which the error signal h of equation (3) would be zero.

$$h = \sum_{i=1}^{N}\sum_{j=1}^{M} a_{ij}\cos(f_i\beta - \phi_{ij}) = 0 \tag{4}$$

Substituting $\cos(f_1\alpha - \phi_{ij}) = \cos\phi_{ij}\cos f_1\beta + \sin\phi_{ij}\sin f_1\beta$ into equation (4) gives the following equation.

$$h = \sum_{i=1}^{N}\sum_{j=1}^{M} a_{ij}(\cos\phi_{ij}\underline{\cos f_i\beta} + \sin\phi_{ij}\underline{\sin f_i\beta}) \tag{5}$$

In equation (5), the separation of error signal h into sine and cosine components (the parts underlined in equation (5)) was a very interesting result. Frequency component amplitude $a_{ij}$ and phase angle $\phi_{ij}$ affected only the sine and cosine amplitude of the error signal. The following shows the result of an investigation to find the conditions under which error signals will go to zero.

For the sum of the sine and cosine components to always be zero, it is necessary for the amplitude of each to be zero. In other words, for h to equal zero in equation (5), the following simultaneous equation has to apply.

$$\left.\begin{array}{l}\sum_{j=1}^{M} a_{ij}\cos\phi_{ij} = 0 \\ \sum_{j=1}^{M} a_{ij}\sin\phi_{ij} = 0\end{array}\right\} i = 1, 2, \ldots, N \tag{6}$$

If the above equation is satisfied, error signals will be zero. This can be achieved by adjusting phase angle $\phi_{ij}$ or amplitude $a_{ij}$. Because it is difficult to adjust the positions of pickups when the sensors have been assembled, amplitude adjustment is easier than phase adjustment. Adjusting the amplitude electrically can be readily accomplished, so in the method of this invention, error signal compensation is effected by adjusting only the amplitude.

Minimum Number of Pickups Required

In accordance with the method of the present invention, the amplitudes of signals from the sensor pickups are adjusted to effect error signal compensation. Each of the pickups is subjected to amplitude adjustment (which can also be considered in terms of adjusting sensitivity or gain). This means that care must be taken to see that the same amplitude adjustment coefficient is applied to all of the error signal frequency components obtained from one pickup. That means that adjustment coefficient $k_j$ is applied to amplitude $a_{ij}$. From equation (6), the following simultaneous equation can be derived, in a matrix representation.

$$\begin{bmatrix} a_{ij}\cos\phi_{ij} \\ a_{ij}\sin\phi_{ij} \end{bmatrix}_{(2N \times M)} \{k_j\}_{(M)} = 0 \quad (7)$$

When adjustment coefficient $k_j$ was being sought as the solution to the equation, the conditions for the existence of a non-zero solution were studied, resulting in the following equation.

$$M \geq 2N+1 \quad (8)$$

This condition shows the relationship between the number N of the frequency components of the error signals to be compensated and the number M of pickups. It can be said that there is a minimum number of pickups, $M_{min}$, required for compensation of N specific error signal frequency components. $M_{min}$ is found from the following equation.

$$M_{min} = 2N+1 \quad (9)$$

Thus, a minimum of three pickups ($M_{min}$=3) are required for compensating one error signal frequency component (N=1), and a minimum of five pickups ($M_{min}$=5) are required for compensating two error signal frequency components (N=2).

When compensating either one or a plurality of error signal frequency components, it is not necessary to compensate all frequency components starting from the lower frequency components. Compensation can be restricted to frequency components selected based on maximum amplitude or other condition. This is discussed below.

Method of Calculating Amplitude Adjustment Coefficient

As described above, it became possible to compensate error signals by applying an amplitude adjustment coefficient $k_j$ to each pickup. With respect to seeking a solution to equation (7), there are countless solutions, including those that are not obvious. There are also countless solutions when the number of pickups is the minimum required (M=2N+1). A single adjustment coefficient can be freely set for selecting a specific one from among those countless solutions. Setting an adjustment coefficient of 1, for example, has the advantage of eliminating the need to adjust signals from that pickup, it being only necessary to calculate the remaining (M−1) coefficients. A specific method of obtaining the adjustment coefficients is explained below.

First, error signals obtained from $M=M_{min}$ pickups are subjected to Fourier transformation, and the amplitudes $a_{ij}$ of N frequency components to be compensated, and their phase angles $\phi_{ij}$, are derived from the frequency spectrum thus obtained. These are used to construct equation (7). Next, a pickup that will not be adjusted is selected. In this example, the pth pickup is not adjusted. Thus, $k_p$=1. To obtain the remaining ($M_{min}$−1) adjustment coefficients, a non-simultaneous equation is obtained by reversing the sign of the pth column in the first matrix on the left side.

$$\begin{bmatrix} a_{ij}\cos\phi_{ij} \\ a_{ij}\sin\phi_{ij} \end{bmatrix}_{(j \neq p)} \{k_j\}_{(j \neq p)} = -\begin{Bmatrix} a_{ip}\cos\phi_{ip} \\ a_{ip}\sin\phi_{ip} \end{Bmatrix} \quad (10)$$

The matrix of the first term on the left becomes a square matrix, and if there is an inverse matrix, the remaining ($M_{min}$−1) amplitude adjustment coefficients can be obtained.

$$\{k_j\}_{(j \neq p)} = -\begin{bmatrix} a_{ij}\cos\phi_{ij} \\ a_{ij}\sin\phi_{ij} \end{bmatrix}_{(j \neq p)}^{-1} \begin{Bmatrix} a_{ip}\cos\phi_{ip} \\ a_{ip}\sin\phi_{ip} \end{Bmatrix} \quad (11)$$

While different solutions can be derived depending on which pickup is selected as the pickup that is not subjected to amplitude adjustment, a unique solution can be obtained if adjustment coefficient scaling is performed to return the overall gain to the pre-adjustment state. Scaling coefficient C can be obtained by the following equation.

$$C = \frac{M}{\sum_{j=1}^{M} k_j} \quad (12)$$

EXAMPLE 1-1

Method of Compensating One Frequency Component

Figure 2:
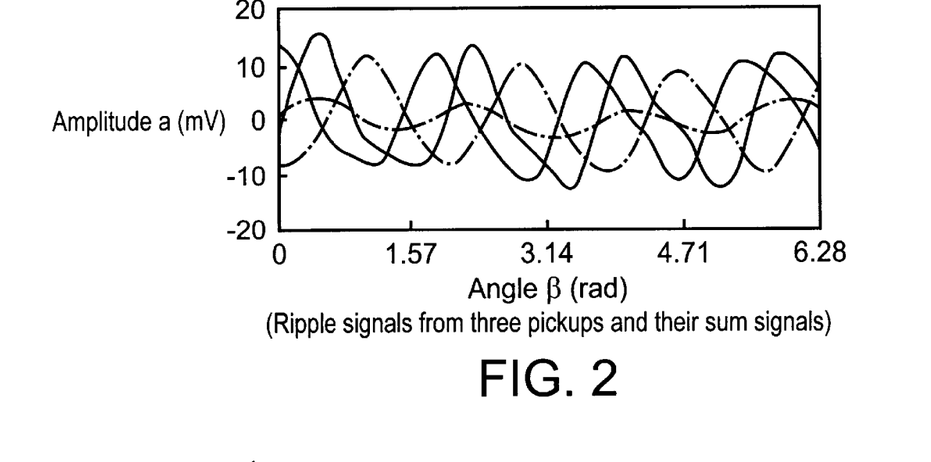
FIG. 2 shows waveforms of error signals from the pickups and their sum.
Figure 3:
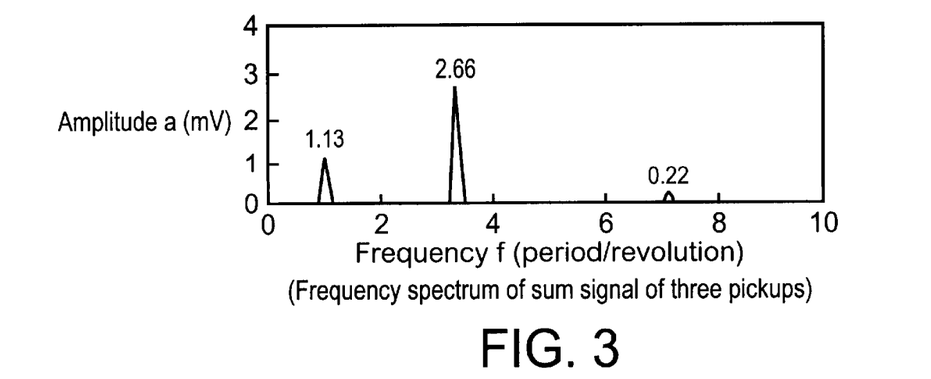
FIG. 3 shows the frequency spectrum of the sum signal shown in FIG. 2.

The minimum number of pickups needed to compensate one error-signal frequency component (N=1) is three ($M_{min}$=3). With the pickups positioned as shown in FIG. 1, with $\Delta\beta$=30 degrees, for example. FIG. 2 shows the error signals, $e_1$, $e_2$, $e_3$ from the pickups, and their sum signal h. To make it easier to understand, ripple signals are shown in millivolt (mV) units, and appropriate amplitude and phase values were selected. FIG. 3 shows the frequency spectrum of the sum signal. Error signals remain having the frequency components $f_1$=1, $f_2$=3.4 and $f_3$=7.2 periods/revolution, with amplitudes of $a_1$=1.13 mV, $a_2$=2.66 mV and $a_3$=0.22 mV, respectively.

In accordance with the amplitude adjustment method described above, the use of three sensor pickups means that just one out of the remaining error signal components can be perfectly compensated. In this case, it was decided to compensate the frequency component with the highest amplitude: $f_2$=3 periods/revolution. Thus, with reference to equation (10), i=2, and j=1, 2, 3. The data obtained after subjecting the signals from each pickup to Fourier transformation are as follows.

$a_{21}$=10.3 mV, $a_{22}$=10.8 mV, $a_{23}$=9.4 mV $\phi_{21}$=−2.04 deg., $\phi_{22}$=−92.48 deg., $\phi_{23}$=159.74 deg.

One adjustment coefficient can be freely chosen, and in this case the selection was $k_1$=1. Using the method of calculation described in the foregoing resulted in solutions of $k_2$=0.313 and $k_3$=1.151. The selection of $k_2$=1 resulted in a large overall gain from solutions of $k_1$=3.193 and $k_2$=3.675. Assuming amplitude adjustment is applied to all of the pickups, applying scaling coefficient C to return to the overall amplification factor results in the following adjustment coefficients.

$k_1=1.218, k_2=0.381, k_3=1.401$

Figure 4A:
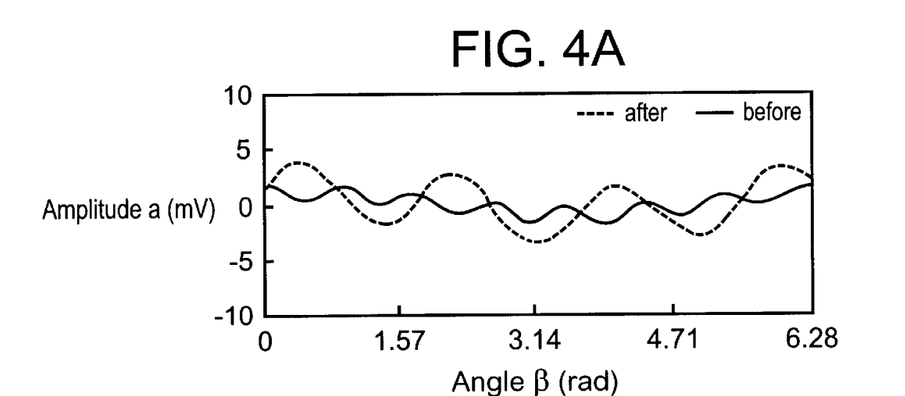
FIG. 4 shows waveforms of error signals before and after gain adjustment.
Figure 4B:
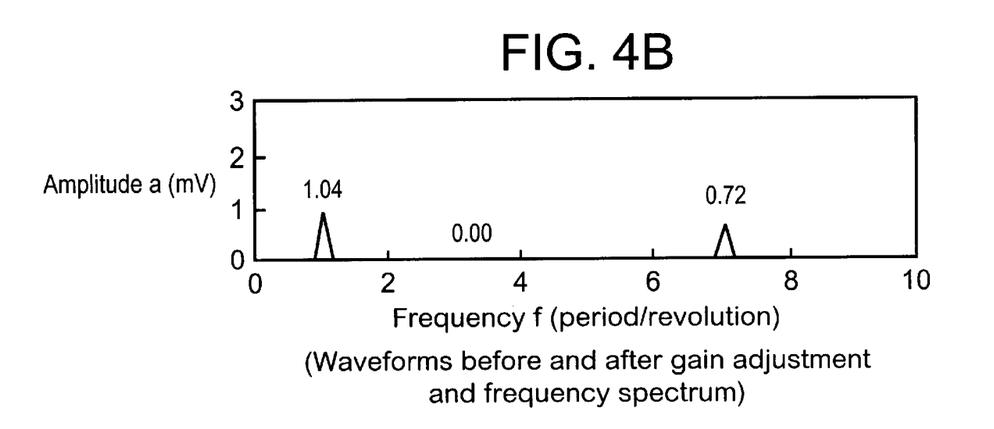

This result was applied to each pickup, producing an effective enough compensation of the target error signal components, as shown in FIG. 4. The error signal component of frequency $f_2=3.4$ periods/revolution was completely compensated. At the same time, the amplitude of frequency component $f_1=1$ periods/revolution decreased slightly, while the amplitude of frequency component $f_3=7.2$ periods/revolution increased somewhat.

EXAMPLE 1-2

Simultaneous Compensation of Two Frequency Components

Figure 5:
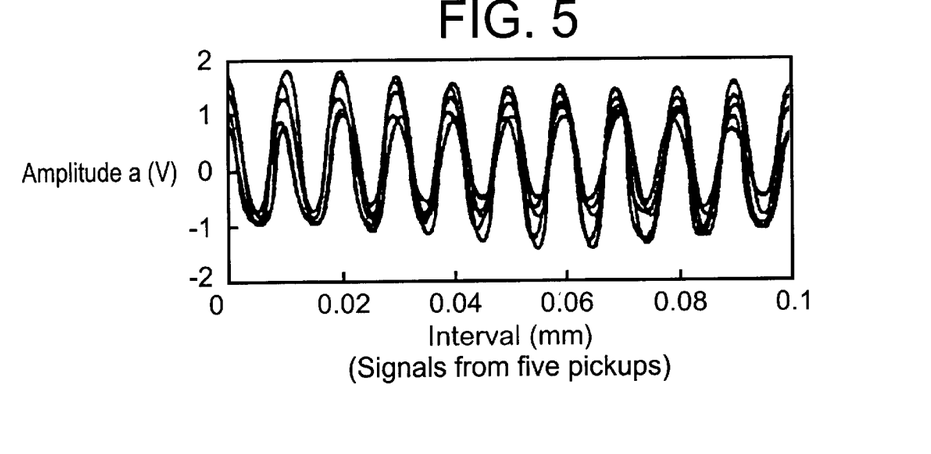
FIG. 5 shows waveforms of error signals from five pickups.

Next, a linear position sensor system such as a linear scale is assumed, and it is also assumed that optical pickups are used that provide a cosine output at a period of 10 μm. And, it is assumed that error signals with ten times the period and with half the period are superposed on the output signals. In order to improve sensor accuracy and resolution, it is desirable to compensate these error signals. A minimum of five pickups ($M_{min}=5$) are needed for compensation of two frequency components (N=2). It is assumed that the pickups are positioned at set intervals, such as 2 mm, for example. Each pickup will have some positional error, so signals output by the pickups will include amplitude and phase errors, as shown in FIG. 5.

Figure 6A:
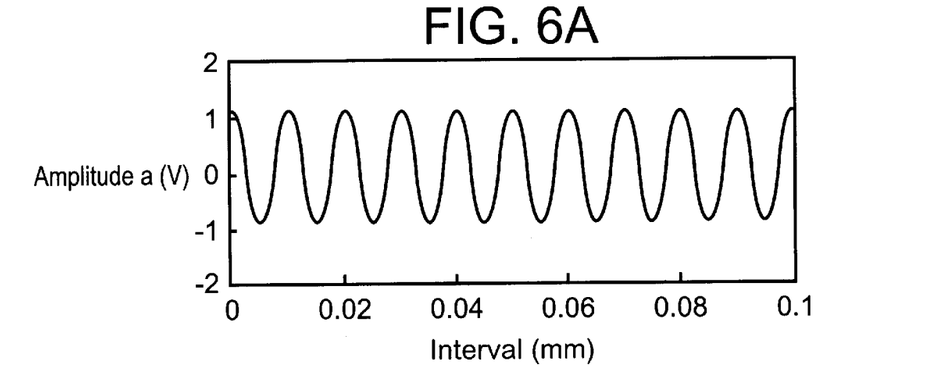
FIG. 6 shows a waveform of a sum signal of the outputs of FIG. 5, and the frequency spectrum of the sum signal.
Figure 6B:
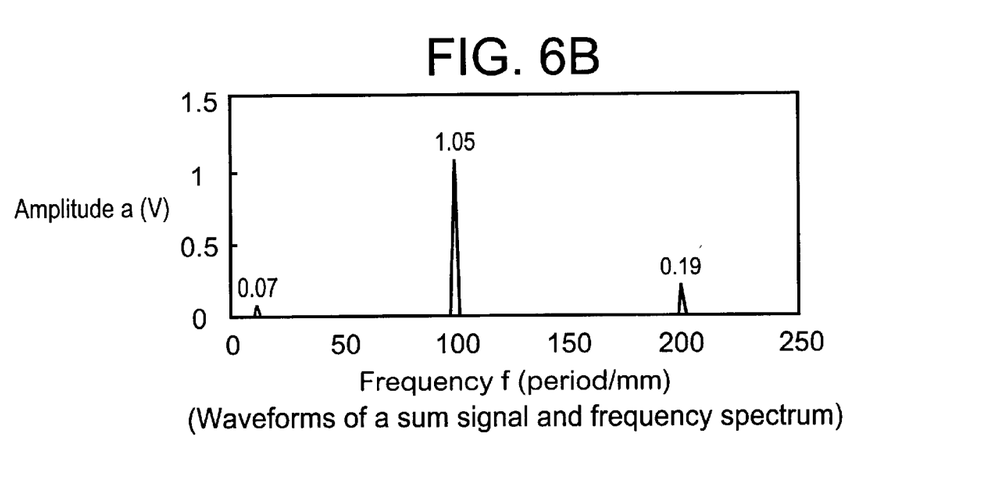

FIG. 6 shows the waveform of the sum of the output signals of all of the pickups, and the frequency spectrum of the sum signal. The frequency component $f_2=100$ periods/mm is used for position sensing. The other frequency components, i.e. $f_1=10$ periods/mm and $f_3=200$ periods/mm, include error components. Two components are to be corrected: i=1, 3, j=1, 2, 3, 4, 5. The results obtained by Fourier transformations are as follows.

|  | j = 1 | 2 | 3 | 4 | 5 |
|---|---|---|---|---|---|
| $a_{ij}$ (V) | | | | | |
| i = 1 | 0.29 | 0.14 | 0.01 | 0.28 | 0.11 |
| i = 3 | 0.26 | 0.33 | 0.09 | 0.21 | 0.19 |
| $\phi_{ij}$ (deg.) | | | | | |
| i = 1 | −71.3 | 144.8 | 105.9 | −37.2 | −177.6 |
| i = 3 | 14.0 | 16.0 | −42.0 | −24.0 | 48.0 |

As in the case of compensating one component, described above, scaling is applied to the outputs of all pickups to effect equalization between post-adjustment and pre-adjustment output levels. The following are the results obtained.

$k_1=1.75, k_2=-2.01, k_3=2.65, k_4=1.84, k_5=4.27$

What is interesting is the appearance of negative adjustment coefficients. This shows that in some circumstances there is a need for opposite phase for the signals from pickups.

Figure 7A:
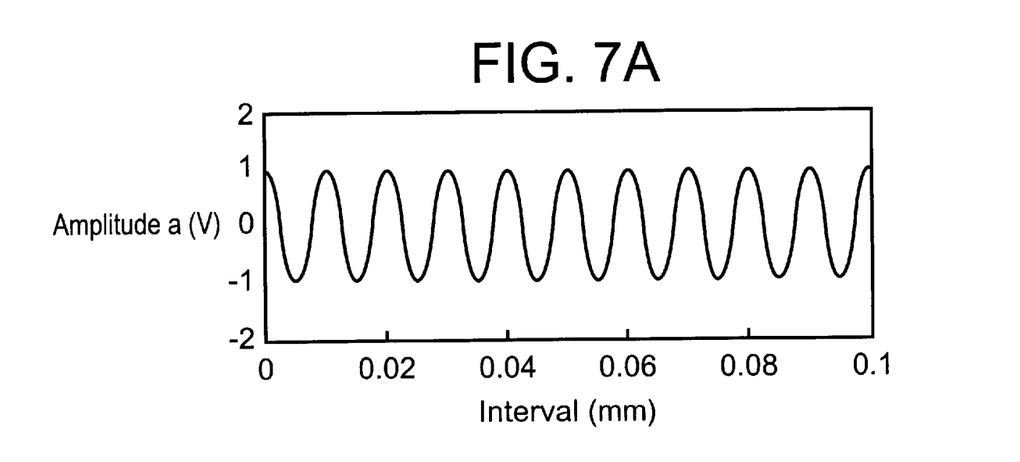
FIG. 7 shows the sum signal obtained from five pickups after adjustment, and the frequency spectrum of the sum signal.
Figure 7B:
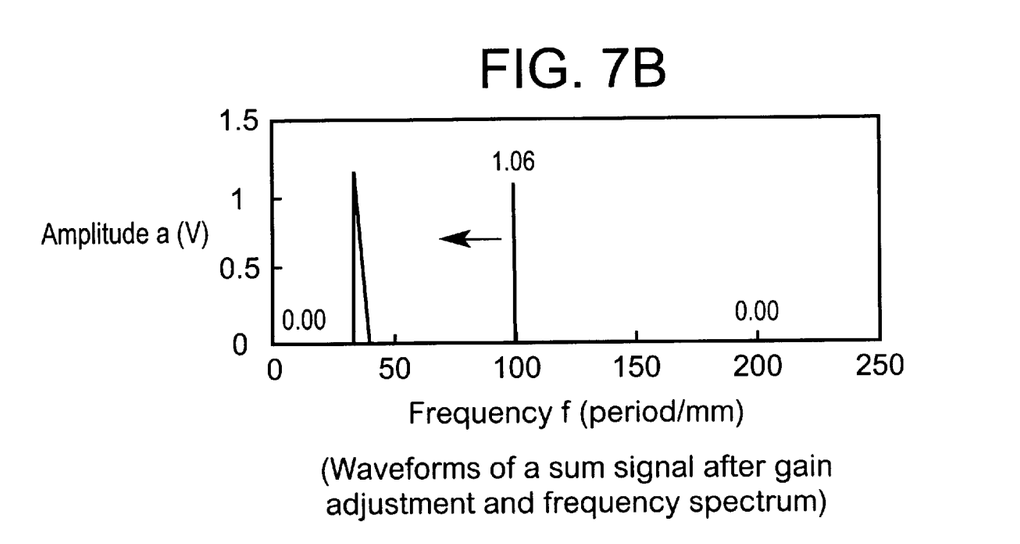

FIG. 7 shows the sum of the signals obtained from the five pickups after adjustment. Compared to before adjustment, cosine outputs exhibiting good accuracy were obtained. The two frequency components other than the frequency component required for sensing were fully compensated.

Methods for compensating periodic error signals in instrumentation have been described in the foregoing. Based on the assumption that the sensors are comprised of a plurality of pickups, the amplitude of the signals from each pickup was adjusted. A minimum of three pickups are required for compensation of one frequency component of an error signal. The minimum number of pickups required for simultaneous compensation of a plurality of frequency components was also established. Specific examples were presented of compensation of one and two frequency components.

The method of this invention applies to compensation of periodic error signals, regardless of whether the sensors concerned are rotary or linear. The method can be realized in hardware and in software. A computer can be used to automatically calculate adjustment coefficients, enabling the implementation of an automatic system that can quickly perform adjustments, such as the sensor gain adjustment system shown in FIG. 8. The main components of this sensor gain adjustment system 10 are a sensor 11 equipped with M sensing pickups constituted by strain gages or the like; the signal processing circuit 12 of the sensor 11; memory section 13 for storing gain adjustment values calculated for each pickup; and a drive unit 15 that drives the object being sensed and outputs data such as the actual position, speed and acceleration of the object. The signal processing circuit 12 and control unit 14 are microcomputer-based.

Figure 9:
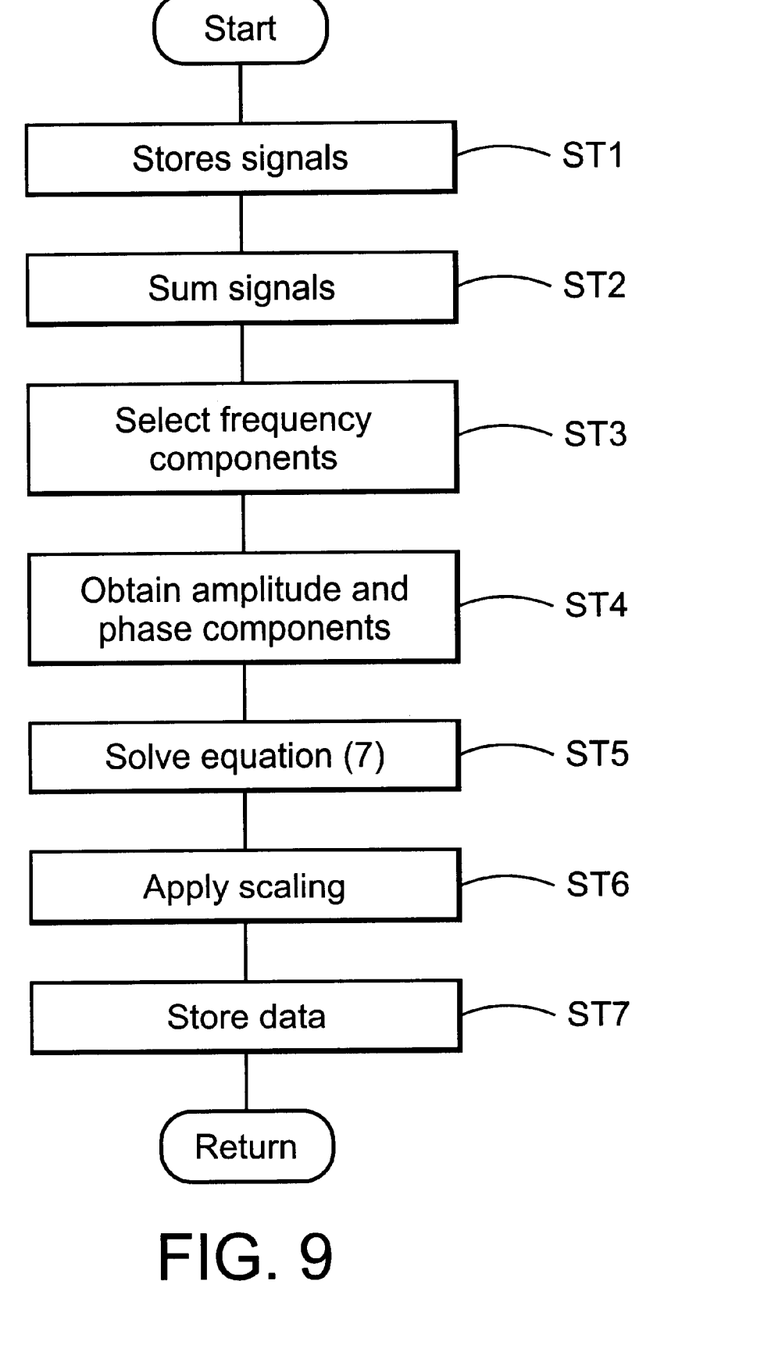
FIG. 9 is a flow chart of the method used by the system of FIG. 8 for periodic error signal compensation.

FIG. 9 is a flow chart of the operation of the system 10. With reference to FIG. 9, in step ST1, when the drive unit 15 drives the sensing object, sensing signals are output by the M pickups and stored in the control unit 14. In step ST2 the control unit 14 sums the M signals. In step ST3, from the sum signal, selection is made of N frequency components in respect of which it is desired to zero the amplitude thereof. The frequency components to be selected can, for example, be specified by an external instruction input to the control unit 14. In step ST4, the control unit 14 obtains the amplitude and phase of N frequency components in the signals from M pickups. The calculations involved can be done using discrete and fast Fourier transforms.

Figure 10A:
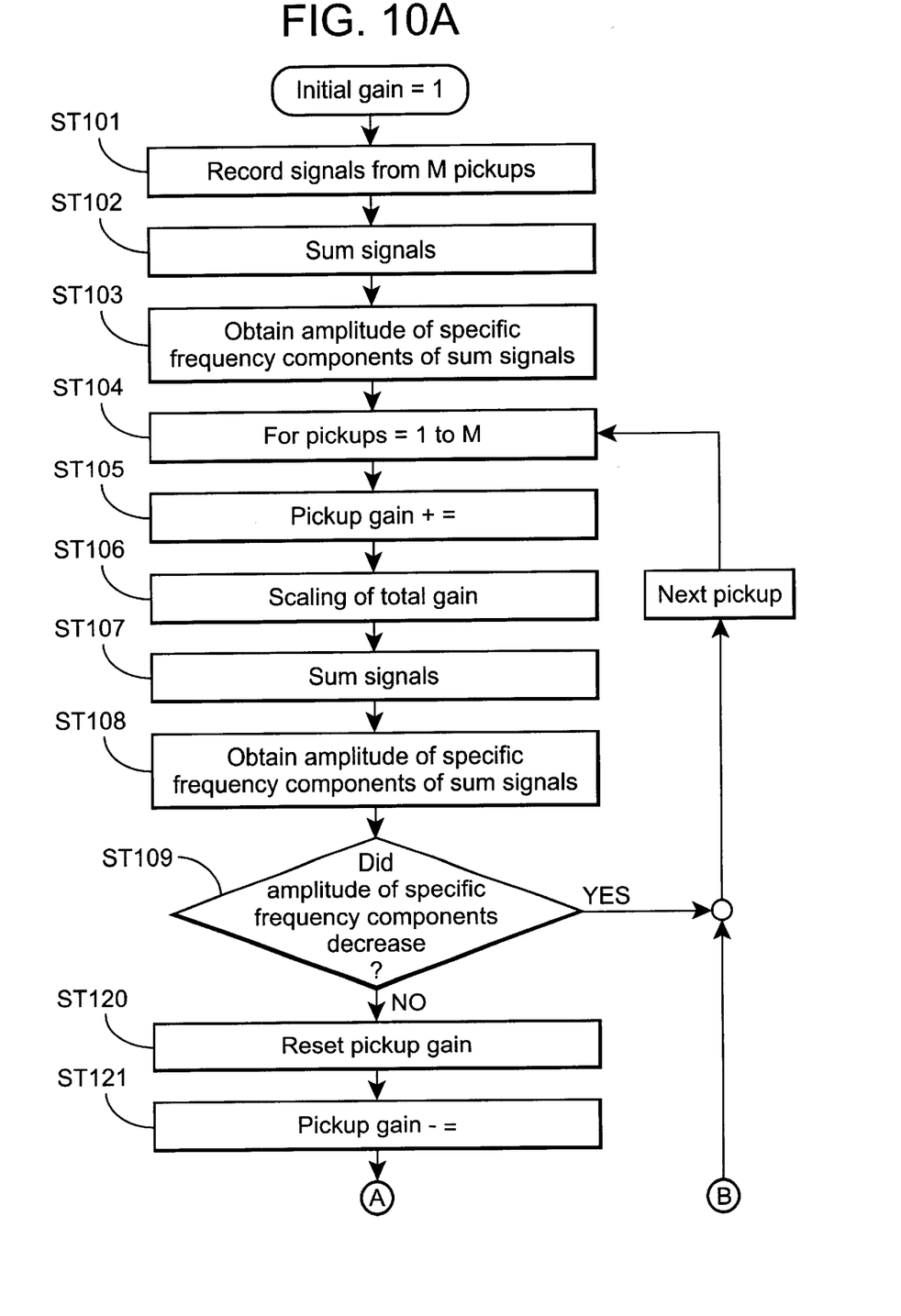
FIG. 10 is a flow chart showing another example of the compensation method of FIG. 9.
Figure 10B:
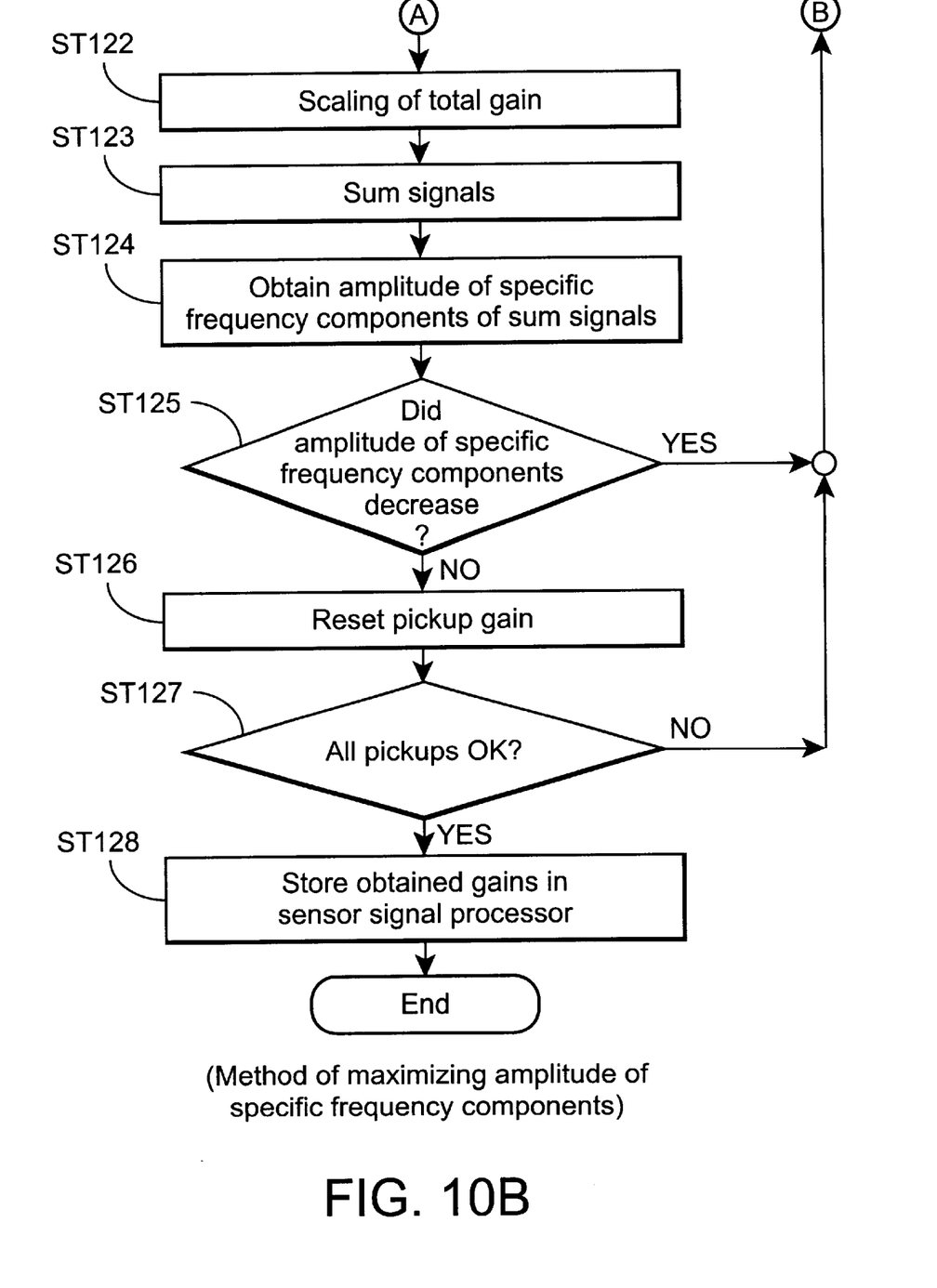
Figure 11A:
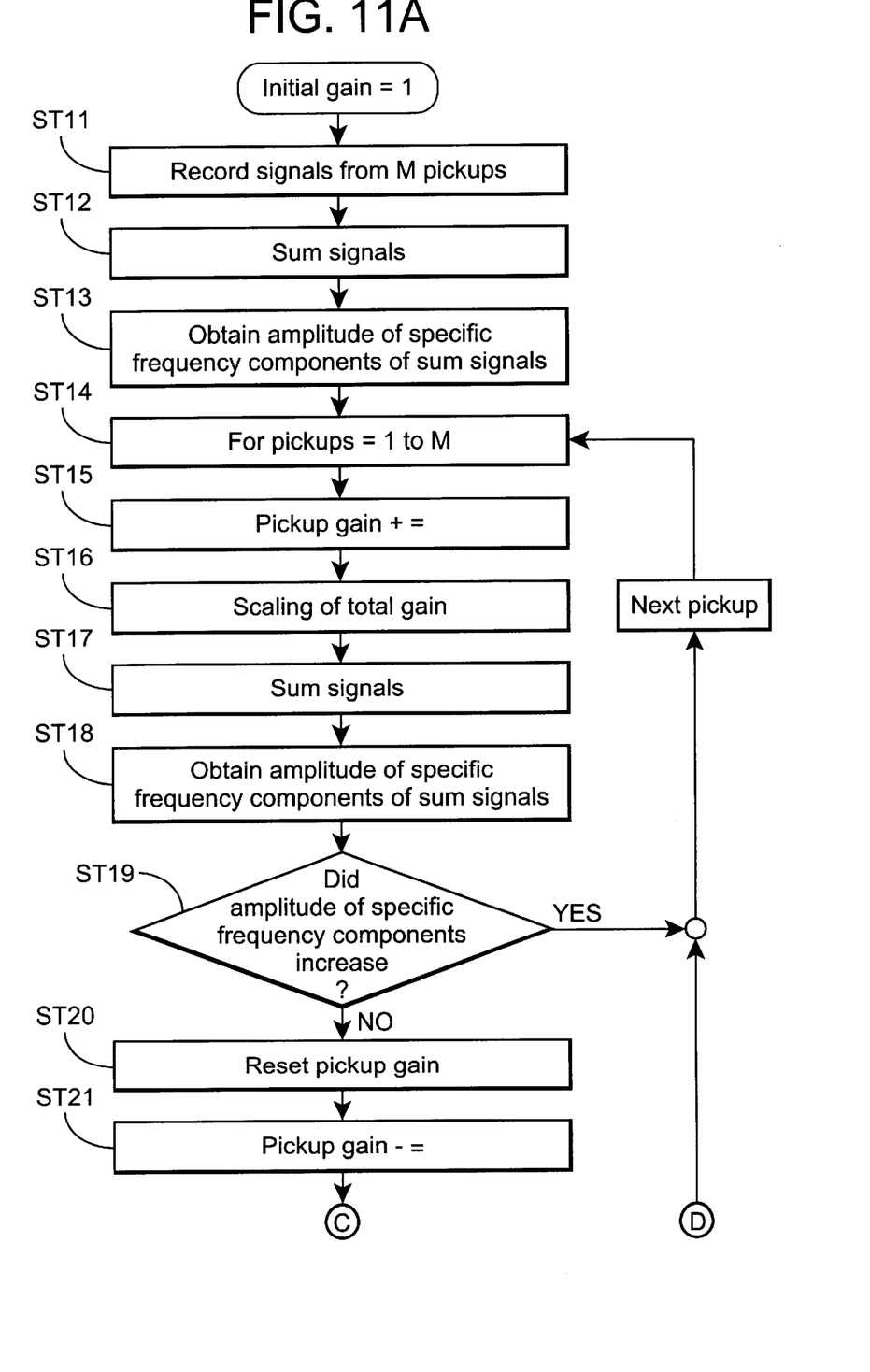
FIG. 11 is a flow chart of an example of a sensor output gain adjustment method according to the present invention.
Figure 11B:
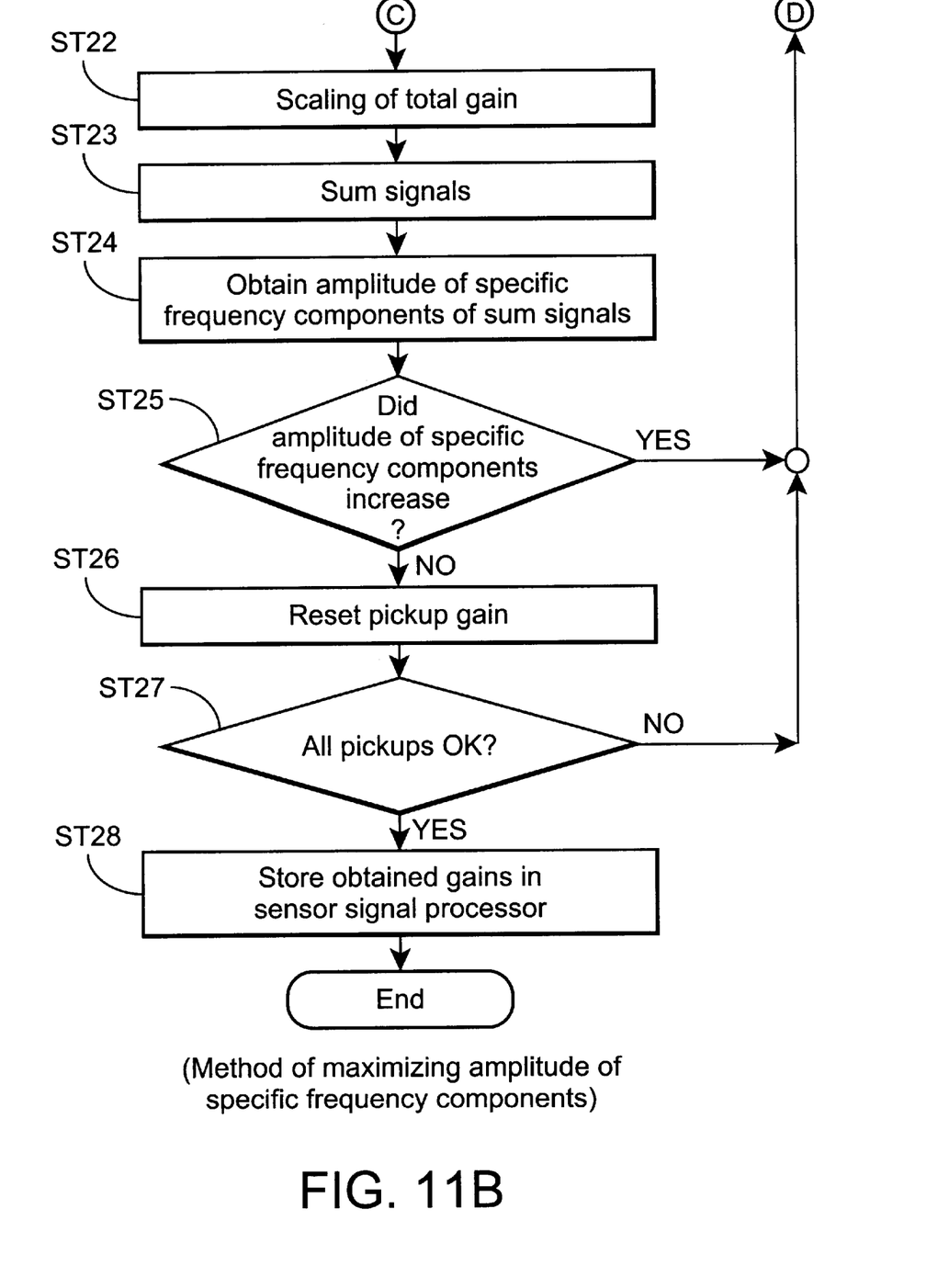
Figure 12A:
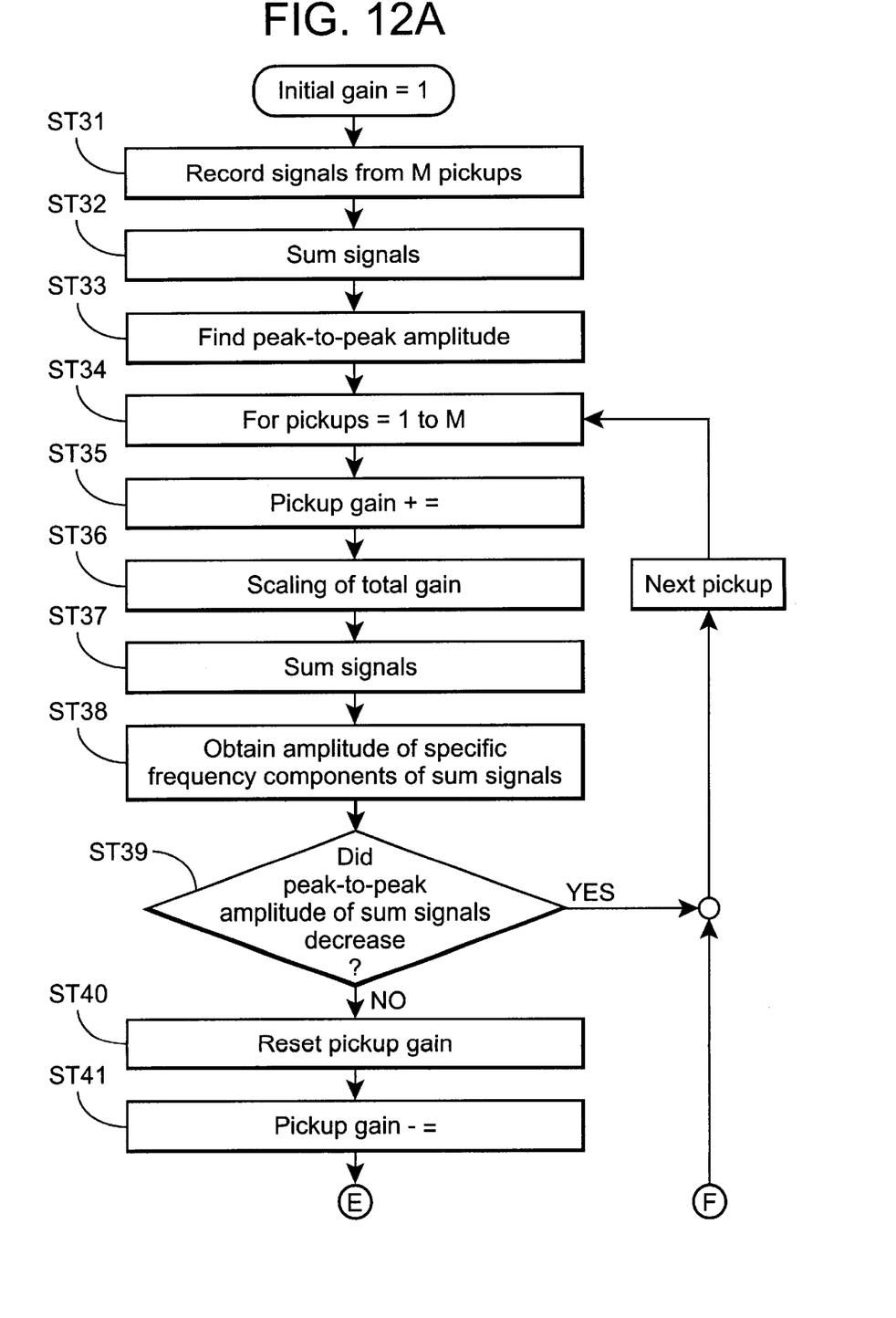
FIG. 12 is a flow chart of another example of a sensor output gain adjustment method according to the present invention.
Figure 12B:
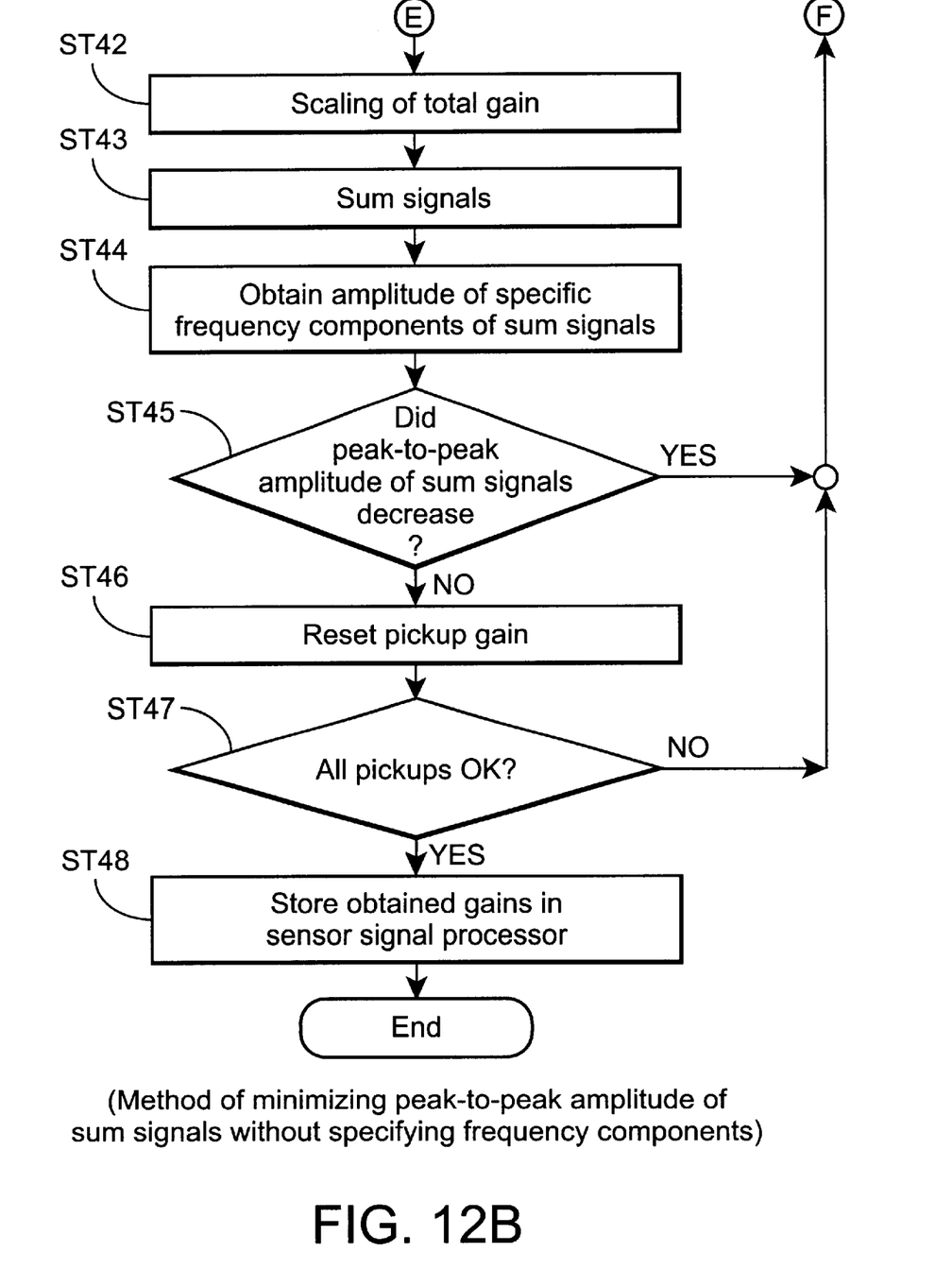

Next, in step ST5, the control unit 14 finds solutions to equation (7), and uses the algorithms illustrated by FIGS. 10, 11 and 12 to find the gain adjustment coefficient kj for each pickup. In step ST6, the control unit 14 applies scaling (equation (12)) to calculate the gain adjustment coefficients required to have the sum signal coincide with the pre-adjustment values. In step ST7, the gain adjustment coefficients thus calculated are stored in the memory section 13.

In operation, sensing signals from the pickups of the sensor 11 are adjusted by the signal processing circuit 12 based on the gain adjustment coefficients stored in the memory section 13. As a result, sensing signals are generated in which N periodic error signals have been eliminated or suppressed. These signals enable sensing to be effected with good accuracy. Although the above explanation has been made with reference to a method of perfectly compensating specific frequency components, it is also possible to implement optimized adjustment for minimizing the overall amplitude error signals that include a plurality of frequency components.

EXAMPLE 1-3

Method of Removing a Specific Frequency Component

Gain adjustment coefficients can also be found experimentally, instead of by using equation (7). FIG. 10 shows a flow chart of the control process used to accomplish this in which:

ST101: Record signals from M pickups (M signals)
ST102: Sum signal=(M signals×M gains)
ST103: Obtain amplitude of specific frequency components of sum signal (using Fourier transforms, etc.)
ST104: For pickups=1 to M
ST105: Pickup gain +=
ST106: Scaling of total gain (to adjust to pre-adjustment level)
ST107: Sum signal=(M signals×M gains)
ST108: Obtain amplitude of specific frequency components of sum signal (using Fourier transforms, etc.)
ST109: Did amplitude of specific frequency components decrease?
ST120: Reset pickup gain
ST121: Pickup gain −=
ST122: Scaling of total gain (to adjust to pre-adjustment level)
ST123: Sum signal=(M signals×M gains)
ST124: Obtain amplitude of specific frequency components of sum signal (using Fourier transforms, etc.)
ST125: Did amplitude of specific frequency components decrease?
ST126: Reset pickup gain
ST127: All pickups OK?
ST128: Store obtained gains in sensor signal processor.

Figure 8:
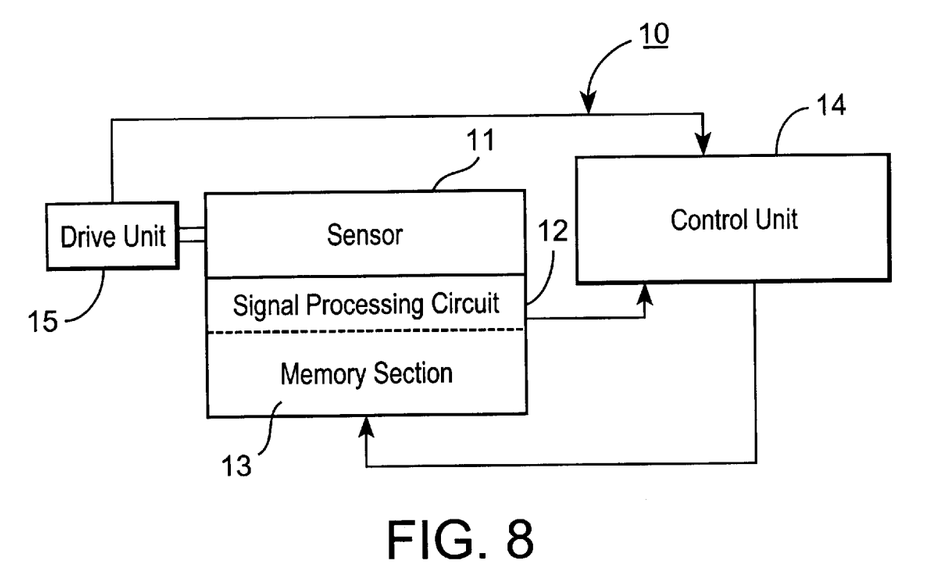
FIG. 8 shows the arrangement of a sensor gain adjustment system.

The system shown in FIG. 8 can also be used in this case. With reference to FIG. 10, if M is the initial sum signal gain, in step ST101, signals from M pickups are recorded. Next, in step ST102, the sum of these signals is calculated. In step ST103, Fourier transformations, for example, are used to find the amplitude of the specific frequency components it is desired to eliminate. Following this, steps ST104 to ST109 are implemented with respect to each of the M pickups.

Specifically, in one cycle, one of the pickups is left unmodified except with respect to gain, which is increased by the small, predetermined amount Δ. Scaling is performed so that the total gain obtained from the M pickups equals the total gain prior to adjustment. Following the gain adjustment, the sum of the M pickup signals is obtained, and Fourier transformations or other such techniques are used to calculate the amplitude of the specific frequency components in the sum signal. If the amplitude thus obtained in smaller than the amplitude was prior to the adjustment, the same steps are implemented in respect of the next pickup.

However, steps ST120 to ST125 are implemented if the amplitude of a specified frequency component increases when gain in respect of a pickup is increased by the small increment Δ. In this case, the pickup gain is reduced by the amount Δ and scaling is performed, adjusting the gain of each pickup until the total gain of the M pickups is the same as the total gain before adjustment. Following gain adjustment, the sum of the M pickup signals is obtained and a technique such as Fourier transformation is used to obtain the amplitude of specific frequencies in the sum signal. If the amplitude thus obtained is smaller than the amplitude was prior to the adjustment, steps ST104 to ST109 are implemented with respect to the next pickup.

If in respect to a pickup the amplitude of a specific frequency component does not decrease even after going through steps ST104 to ST109 and ST120 to ST125, in step ST126 the gain of the pickup concerned is reset, and via step ST127 the process moves on to the gain adjustment of the next pickup. After completing adjustment of all pickups, in step ST128 the adjusted gains of the individual pickups are stored in the signal processing section.

EXAMPLE 2

Method of Maximizing Amplitude of Specific Frequency Component

Next, instead of removing or suppressing error signals, a method of increasing the amplitude of signal frequency components required for the sensing will be explained. FIG. 11 is a flow chart of the control process used by this method in which:

ST11: Record signals from M pickups (M signals)
ST12: Sum signal=(M signals×M gains)
ST13: Obtain amplitude of specific frequency components of sum signal (using Fourier transforms, etc.)
ST14: For pickups=1 to M
ST15: Pickup gain +=
ST16: Scaling of total gain (to adjust to pre-adjustment level)
ST17: Sum signal=(M signals×M gains)
ST18: Obtain amplitude of specific frequency components of sum signal (using Fourier transforms, etc.)
ST19: Did amplitude of specific frequency components increase?
ST20: Reset pickup gain
ST21: Pickup gain −=
ST22: Scaling of total gain (to adjust to pre-adjustment level)
ST23: Sum signal=(M signals×M gains)
ST24: Obtain amplitude of specific frequency components of sum signal (using Fourier transforms, etc.)
ST25: Did amplitude of specific frequency components increase?
ST26: Reset pickup gain
ST27: All pickups OK?
ST28: Store obtained gains in sensor signal processor The system shown in FIG. 8 can also be used in this case. With reference to FIG. 11, if M is the initial total signal gain, in step ST11, signals from M pickups are recorded. Next, in step ST12, the sum of these signals is calculated. In step ST13, Fourier transformations, for example, are used to find the amplitude of the specific frequency components it is desired to eliminate. Following this, steps ST14 to ST19 are implemented with respect to each of the M pickups.

Specifically, in one cycle, the gain of just one of the pickups is increased by the small, predetermined amount Δ, with the gain of the other pickups being left unmodified. Scaling is performed so that the total gain obtained from the M pickups equals the total gain prior to adjustment. After the gain adjustment, the sum of the M pickup signals is obtained, and Fourier transformations or other such techniques are used to calculate the amplitude of the specific frequency components in the sum signal. If the amplitude thus obtained is smaller than the amplitude was prior to the adjustment, the same steps are implemented with respect to the next pickup.

Steps ST20 to ST25 are implemented if the amplitude of a specified frequency component decreased when the gain in respect of a pickup is increased by the small amount Δ. In this case, the pickup gain is reduced by the amount Δ and scaling is performed, the gain of each pickup being adjusted until the total gain of the M pickups is the same as the total gain prior to adjustment. Following the adjustment of the gain, the sum of the M pickup signals is obtained and a technique such as Fourier transformation is used to obtain the amplitude of specific frequencies in the sum signal. If the amplitude thus obtained is greater than the amplitude was prior to the adjustment, steps ST14 to ST19 are implemented with respect to the next pickup.

If in respect to a pickup the amplitude of a specific frequency component does not increase even after going through steps ST14 to ST19 and ST20 to ST25, in step ST26 the gain of the pickup concerned is reset, and via step ST27 the process moves on to the gain adjustment of the next pickup. After completing adjustment of all pickups, in step ST28 the adjusted gains of the individual pickups are stored in the signal processing section.

EXAMPLE 3

Method of Minimizing Peak-to-Peak Amplitude of Sum Signal

The peak-to-peak amplitude of the sum signal can be minimized instead of removing or suppressing error signals or maximizing the amplitude of specific frequency components of the sensing target. FIG. 12 is a flow chart of the control process used in this method in which:

ST31: Record signals from M pickups (M signals)
ST32: Sum signal=(M signals×M gains)
ST33: Obtain peak-to-peak amplitude of sum signal
ST34: For pickups=1 to M
ST35: Pickup gain +=
ST36: Scaling of total gain (to adjust to pre-adjustment level)
ST37: Sum signal=(M signals×M gains)
ST38: Obtain peak-to-peak amplitude of sum signal
ST39: Did peak-to-peak amplitude of sum signal decrease?
ST40: Reset pickup gain
ST41: Pickup gain −=
ST42: Scaling of total gain (to adjust to pre-adjustment level)
ST43: Sum signal=(M signals×M gains)
ST44: Obtain peak-to-peak amplitude of sum signal
ST45: Did peak-to-peak amplitude of sum signal decrease?
ST46: Reset pickup gain
ST47: All pickups OK?
ST48: Store obtained gains in sensor signal processor.

The system shown in FIG. 8 can also be used in this case. With reference to FIG. 12, if M is the initial total signal gain, in step ST31, signals from M pickups are recorded. Next, in step ST32, the sum of these signals is calculated. In step ST33, Fourier transformations, for example, are used to find the peak-to-peak amplitude of the sum signal. Following this, stage ST34 to ST39 are implemented with respect to each of the M pickups.

Specifically, in one cycle, the gain of just one of the pickups is increased by the small, predetermined amount Δ, while the gain of the other pickups is left unmodified. Scaling is performed so that the total gain of the M pickups equals the total gain prior to adjustment. After the gain adjustment, the sum of the M pickup signals is obtained, and Fourier transformations or other such techniques are used to calculate the peak-to-peak amplitude of the sum signal. If the peak-to-peak amplitude thus obtained is smaller than the amplitude was prior to the adjustment, the same steps are implemented with respect to the next pickup.

Steps ST40 to ST45 are implemented if the peak-to-peak amplitude of the sum signal does not decrease when the gain in respect of a pickup is increased by the amount Δ. In this case, the pickup gain is reduced by the amount Δ and scaling is performed, the gain of each pickup being adjusted until the total gain of the M pickups equals the total gain prior to adjustment. Following the adjustment of the gain, the sum of the M pickup signals is obtained and the peak-to-peak amplitude of the sum signal is obtained. If the peak-to-peak amplitude thus obtained is smaller than prior to the adjustment, steps ST34 to ST39 are implemented with respect to the next pickup.

If in respect to a pickup the peak-to-peak amplitude of the sum signal does not decrease even after going through steps ST34 to ST39 and ST40 to ST45 in step ST46 the gain of the pickup concerned is reset, and via step ST47 the process moves on to the gain adjustment of the next pickup. After completing adjustment of all pickups, in step ST48 the adjusted gains of the individual pickups are stored in the signal processing section.

As described in the foregoing, the method according to the present invention for compensating periodic error signals in sensor output comprises obtaining the sum of sensing signals output by M sensor elements (pickups), selecting N (M≧2N+1) frequency components from this sum signal, and calculating the amplitude and phase of the selected N frequency components. Equation (7) is used to find the gain of each pickup signal, or the gain is found that can suppress or remove the N frequency components by repeating a process of increasing/decreasing the signal gains of each pickup. Scaling of the calculated gains is used to obtain the adjustment gains for the pickups whereby the overall gain coincides with the initial sum signal level. Using these adjustment gains to adjust the gain of the signals output by the individual sensor pickups enables the generation of sensing signals from which the selected error signal components have been removed or suppressed. Removing or suppressing error signal components by adjusting the gain of the pickups in accordance with the method of this invention increases the positioning accuracy of the pickups and enables sensing signals having good accuracy to be obtained.

In accordance with the method of the invention for adjusting gain of sensor output signals, comprises obtaining the sum of sensing signals output by M sensor pickups, selecting specific frequency components from this sum signal, and calculating the amplitude of the selected specific frequency components. For each pickup, the gain is calculated at which the specific frequency components are maximized. This is done by repeating a process of increasing/decreasing the output signal gains of each pickup. Pickup outputs are multiplied by the respective calculated gain values and the results are summed. Scaling is used to adjust the calculated gains to obtain the pickup adjustment gains whereby the overall gain coincides with the sum signal level. Using these adjustment gains to adjust the gain of the signals output by the individual sensor pickups enables the generation of sensing signals in which the selected frequency components are maximized. Maximizing the required frequency components improves the S/N ratio, easing positioning requirements and the like with respect to the sensor pickups.

The gain adjustment method of the invention also comprises obtaining the sum of sensing signals output by M sensor pickups, obtaining the peak-to-peak amplitude of the sum signal, and finding the gain of the individual pickups at which the peak-to-peak amplitude is minimized by a process of increasing/decreasing the output gain of the pickups. The output gain of each pickup is multiplied by the respective gain value thus calculated, and the results are summed to obtain a sum signal. So that the sum signal level equals the sum signal level of the individual pickup outputs, scaling is used to adjust each calculated gain to obtain an adjustment gain for each pickup. Using these adjustment gains to adjust the gain of the signals output by the individual. sensor pickups results in the generation of sensing signals that minimize the peak-to-peak amplitude of the sum signal. The ability to suppress error signal components in accordance with the method of the invention eases positioning requirements and the like with respect to the sensor pickups.

What is claimed is:

1. A method of compensating periodic error signals in sensor output, comprising the steps of:

obtaining a sum signal from sensing outputs of M sensor elements (where M is a positive integer);

obtaining amplitude and phase of N frequency components included in the sum signal (where N is a positive integer);

taking $a_{ij}$ as sensing output amplitude of the jth (j=1 to N) sensor element at the ith (i=1 to N) frequency component, $\psi_{ij}$ as phase angle and $k_j$ as sensing output gain adjustment coefficient, obtaining adjustment coefficient kj for each sensor output by the simultaneous equation $$\begin{bmatrix} a_{ij}\cos\phi_{ij} \\ a_{ij}\sin\phi_{ij} \end{bmatrix}_{(2N\times M)} \{k_j\}_{(M)} = 0 \quad (7)$$

ensuring that a sum signal level obtained by summing a pre-adjustment output of each sensor element multiplied by the gain adjustment coefficient $k_j$ equals a sum signal level obtained by summing unmodified outputs of said sensors, by obtaining a gain adjustment coefficient $k_j$ for each sensor output by using a scaling coefficient C obtained by $$C = \frac{M}{\sum_{j=1}^{M} k_j} \quad (12)$$

to perform pre-adjustment scaling of each gain adjustment coefficient $k_j$, and using each adjustment gain $k_j$ thus obtained to adjust a gain of each sensor output.

2. The method according to claim 1, wherein in place of said simultaneous equation, N frequency components are removed or minimized by using a gain adjustment coefficient obtained for each sensor output by repeating for each sensor output a process comprising changing an output gain of one sensor in small increments while maintaining output gains of other sensors at a constant level.

3. A gain adjustment method for maximizing a specific frequency component in sensor output, comprising the steps of:

obtaining a sum signal from sensing outputs of M sensor elements;

calculating amplitude of specific frequency components from the sum signal;

obtaining sensor output gains at which the specific frequency components are maximized by repeating for each sensor output a process comprising changing the output gain of one sensor in small increments while maintaining output gains of other sensors at a constant level;

ensuring that a sum signal level obtained by summing the outputs of the sensor elements each multiplied by the calculated gain equals a sum signal level obtained by summing unmodified outputs of said sensors, by obtaining an adjustment gain for each sensor output by using scaling to adjust each calculated gain; and using each adjustment gain thus obtained to adjust the gain of each sensor output signal to generate a sum signal in which said frequency components are maximized.

4. A gain adjustment method for maximizing a specific frequency component in sensor output, comprising the steps of:

obtaining a sum signal from sensing outputs of M sensor elements;

obtaining a peak-to-peak amplitude of the sum signal;

obtaining the sensor output gains that give a minimum peak-to-peak amplitude of the sum signal by repeating for each sensor output a process comprising changing the output gain of one sensor in small increments while maintaining the output gains of other sensors at a constant level;

ensuring that a sum signal level obtained by summing the outputs of the sensor elements each multiplied by the calculated gain equals a sum signal level obtained by summing unmodified outputs of said sensors, by obtaining an adjustment gain for each sensor output by using scaling to adjust each calculated gain; and using each adjustment gain thus obtained to adjust a gain of each sensor output signal to generate a sensing signal in which there is minimum peak-to-peak amplitude of the sum signal of the sensor outputs.

* * * * *